United States Patent [19]
Colligan et al.

[11] Patent Number: 5,794,835
[45] Date of Patent: Aug. 18, 1998

[54] FRICTION STIR WELDING

[75] Inventors: Kevin J. Colligan, North Bend; Steven J. Avila, Puyallup, both of Wash.

[73] Assignee: The Boeing Company, Seattle, Wash.

[21] Appl. No.: 655,839

[22] Filed: May 31, 1996

[51] Int. Cl.$^6$ ................................................ B23K 20/12
[52] U.S. Cl. .................... 228/2.1; 228/13; 407/34; 407/53; 29/566
[58] Field of Search ...................... 228/2.1, 13, 19; 409/234; 407/34, 53; 29/566

[56] References Cited

U.S. PATENT DOCUMENTS

| | | | |
|---|---|---|---|
| 2,219,907 | 10/1940 | Ross | 407/34 |
| 3,228,267 | 1/1966 | Hebert | 407/34 |
| 3,550,229 | 12/1970 | Zenses | 407/53 |
| 4,103,138 | 7/1978 | Moriki | |
| 5,460,317 | 10/1995 | Thomas et al. | |

FOREIGN PATENT DOCUMENTS

| | | |
|---|---|---|
| WO 93/10935 | 6/1993 | WIPO |
| WO 95/26254 | 10/1995 | WIPO |

OTHER PUBLICATIONS

Abstracts and Exemplary Claims of U.S. Patents, pp. 6–14, for: Patent No. 5,469,617; Patent No. 5,460,317, Patent No. 5,262,123, Patent No. 4,811,887, Patent No. 4,605,151, Patent No. 3,460,235, Patent No. 5,170,031, Patent No. 4,959,241.

*Primary Examiner*—Samuel M. Heinrich
*Attorney, Agent, or Firm*—Christensen O'Connor Johnson & Kindness PLLC

[57] ABSTRACT

An improvement to a friction stir welding tool having a rotating member, the improvement including an attachable cutting tool (30) having one or more radial cutting edges (32). A first embodiment of a cutting tool including one or more cutting inserts (42), each cutting insert having a lower end cutting edge; a like number of insert-engaging grooves (44); a collar (46) sized to closely engage around the rotating member with engaged inserts; a collar attachment arrangement for securing the collar (46) to the rotating member (38); and a number of set screws (48) for anchoring the cutting inserts (42) to the member (38). A second embodiment of a cutting tool including a cutting insert holder (60) having a lower end cutting edge; an insert holder hole (62) extending through the rotating member, the insert holder hole oriented angularly away from the rotating member axis of rotation (64); a threaded radial hole (66) formed in the rotating member (38); and a single screw fastener (68) for turning into the radial hole to press against the cutting insert holder. A third embodiment of a cutting tool including one or more tabs (80) extending radially from the rotating member (38). A cornered cutting insert (70) is removably attached to the lower end of each tab. The cornered cutting insert (70) includes one or more corners (72) to act as cutting edges. Additionally provided is an improved method of friction stir welding including attaching a cutting tool having a cutting edge to a conventional friction stir welding tool and providing liquid to the cutting edge as the weld is being formed in order to quickly cool the cutting edge surfaces so that the material will not adhere to the cutting edges, allowing the cutting tool to machine excess weld material away.

19 Claims, 10 Drawing Sheets

FRICTION STIR WELDING

FIELD OF THE INVENTION

The present invention relates to friction welding, and more particularly to an apparatus and method for machining a friction stir weld.

BACKGROUND OF THE INVENTION

Friction stir welding (FSW) is a relatively new welding process invented and patented by The Welding Institute (TWI) of Cambridge, Great Britain. A detailed description of this process and apparatus for performing the process may be found in the patents WO 93/10935; U.S. Pat. No. 5,460,317; and WO 95/26254. In the FSW process, a non-consumable rotating tool is used to "stir" metals along a butt joint. This causes a complete co-mingling of the metals from each side of the joint.

After creating the weld, the upper surface of the weld must be machined for those applications requiring a smooth joint outer surface (e.g., fatigue-loaded components, aerodynamic surfaces, precision contact mating, etc.). It is also helpful to machine a weld joint in order to inspect the weld joint for cracks, flaws, etc. Because FSW is currently performed on a conventional milling machine, it is possible to machine the weld as a second-pass operation. However, this adds significant cost to the process, since it takes twice the time and effort to produce a finished part than the time required for those applications not needing a machined surface.

In addition, future FSW machines are expected to become less like milling machines as they are refined for the specific purpose of welding. In this case, it may become difficult to machine the weld surface with the same machine that performed the welding. This means additional tooling costs and load-unload time will be added to the overall process.

Thus, a need exists for an apparatus and method for machining the surface of a friction stir weld without having to perform a second-pass operation or use a second machine. The present invention is directed to fulfilling this need.

SUMMARY OF THE INVENTION

In accordance with aspects of the present invention, an improvement to a friction stir welding tool is provided, including a cutting tool having one or more radial cutting edges. The cutting tool is attached to a conventional translating friction stir welding tool via one or more support mechanisms so that the improved welding tool will machine the weld as the weld is being generated. The preferred cutting tool includes one or more detachable support mechanisms, such as cutting inserts, attached to a friction stir weld rotating member. Each support mechanism includes a lower end that has a cutting edge either attachably or integrally formed thereat. The preferred cutting edges are disengagable from the rotating member. As the member rotates, the cutting edge also rotates to clear away material disturbed from the probe and the rotating member.

In accordance with other aspects of the invention, a first embodiment of a cutting tool is provided, including one or more cutting inserts, each having an integrally formed lower end cutting edge; a like number of vertically oriented, insert-engaging grooves formed in the rotating member; a collar sized to closely engage over the rotating member with engaged inserts; a collar attachment arrangement for securing the collar to the rotating member; and a number of set screws for anchoring the cutting inserts to the rotating member. The collar may include various threaded radial holes therein placed at locations corresponding to the locations of the cutting inserts and grooves. The holes are for engaging the set screws which press against the cutting inserts and prohibit the cutting inserts from moving during use. The preferred collar includes internal cutouts located adjacent to each cutting insert.

In accordance with still further aspects of the invention, a second embodiment of a cutting tool is provided, including an insert holder hole extending through the rotating member in an orientation angularly away from the axis of member rotation; a cutting insert holder insertable into the insert holder hole; a threaded radial hole formed in the rotating member; and a single screw for screwing into the radial hole to press against the cutting insert holder thereby holding it in place. The cutting insert holder includes a cornered cutting insert removably attached to the lower end of the cutting insert holder. The cornered cutting insert includes one or more extending corners that may serve as cutting edges. When one corner becomes dull, the cornered cutting insert is rotated so that a new corner is used as the cutting edge. Means are provided for securing the cornered cutting insert to the cutting insert holder.

In accordance with still other aspects of the invention, a third embodiment of a cutting tool is provided, including one or more tabs extending radially from the lower end of the rotating member. The tabs may be integrally attached to the rotating member using conventional methods, e.g., welded, molded, etc. A cornered cutting insert is removably attached to each tab so that a corner extends lower that the lowest point of the tab. The corners clear debris from the weld surface as the corners rotate with the rotating member.

In accordance with yet further aspects of the invention, the cutting edges are preferably located near the lower periphery of the rotating member at a depth of about 0.002 to 0.010 inches relative to the rotating member shoulder and a distance of about 0.050 to 0.100 inches outward of the rotating member and/or lower face of the member. Where applicable, each cutting edge is located at the leading edge of its respective support relative to the rotational movement of the rotating member.

In accordance with yet still further aspects of the present invention, an improvement to a friction stir welding process is provided, including attaching a cutting tool having a cutting edge to a conventional friction stir welding tool and providing liquid to the cutting edge as the weld is being formed in order to quickly cool the cutting tool to prevent weld material from adhering to the cutting tool.

In accordance with yet still other aspects of the invention, a preferred process includes providing water at about room temperature (e.g., 10° to 30° C.) and at a flow rate of about 0.01 to 0.10 gallons per minute in the form of a water-air mist. Water may be issued under a pressure.

In accordance with additional aspects of the invention, the rotating member, with its corresponding cutting tool and probe, is angled slightly aftward relative to the direction of linear probe translation.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

3

DETAILED DESCRIPTION OF THE PREFERRED EMBODIMENT

The description below first discusses the friction stir welding process and apparatus as put forth in the above identified patents. The friction stir welding tools and techniques as described in WO 93/10935, U.S. Pat. No. 5,460,317, and WO 95/26254 are incorporated herein by reference to the extent consistent with the present invention. A detailed discussion of the present invention cutting tool improvement apparatus and method follows.

Friction Stir Welding

The technique of friction stir welding to join workpieces together results in the creation of a joint region therebetween, and includes the steps of: causing a probe of material harder than the workpiece material to enter the joint region and one or both opposed portions of the workpieces on either side of the joint region while causing relative cyclic movement between the probe and the workpieces whereby frictional heat is generated to cause the opposed portions to take up a plasticized condition; removing the probe such as by translating the probe along the joint region; and allowing the plasticized portions to solidify and join the workpieces together. This technique enables a wide variety of workpieces to be joined. The workpiece materials can be metals, alloys or compound materials such as metal matrix composites (MMC), or suitable plastic materials such as thermoplastics.

Figure 1:
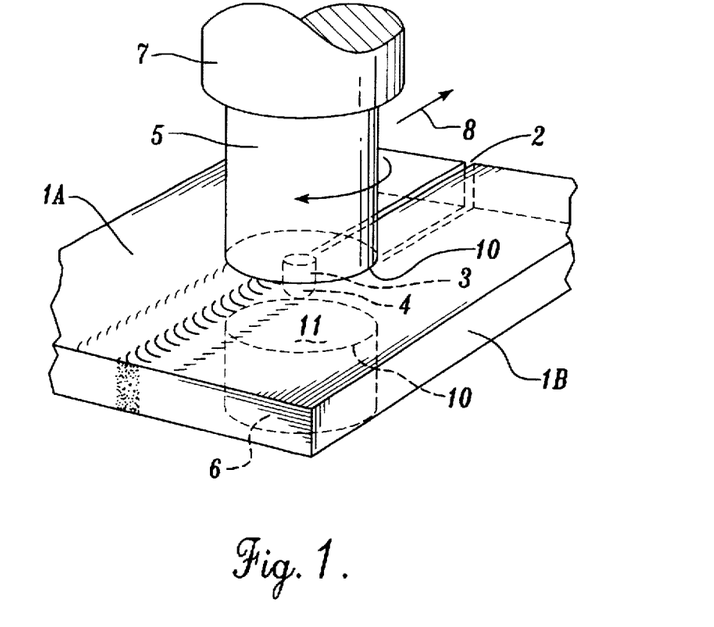
FIG. 1 is an isometric view illustrating a first method of friction stir welding.

The present invention cutting tool improvement may be used with virtually any friction stir welding tool that includes a rotating non-consumable probe. Referring to FIG. 1, there shown is a perspective view of such a tool. A pair

4 of workpieces, or plates 1A, 1B (e.g., aluminum alloy plates) are butted together along a joint line 2. A non-consumable probe 3 (e.g., a steel probe) having a narrow, central, cylindrical tip portion 4 positioned between upper and lower members 5, 6 is brought to the beginning of one end of the joint line 2. The proximate end of each member includes a shoulder 10 and a face 11. The workpieces are not normally urged towards each other during welding, but are simply restrained against movement away from the joint region during passage of the probe.

The rotating member 5 with probe 3, is rotated by motor 7 while the combination is traversed in a direction 8 along the joint line 2 and while the plates are held against lateral movement away from the probe 3. The rotating probe 3 produces friction heating and a local region of highly plasticized material around the steel tip portion 4, while top and bottom constraint is provided by the members 5, 6. Upon removal or through passage of the probe, these plasticized stirred regions will immediately coalesce and solidify. On cooling, the plasticized material bonds the workpieces 1A, 1B together. The method generally results in a mix of the two abutting surfaces, often at mixing temperatures below the normal melting point of the materials to be joined. It is preferable to tilt the rotating member 5 with probe slightly aftward relative to the linear direction of probe travel. The tilt of the probe helps to bring the shoulder and a portion of the face into contact with the joint surface, which further aids in plasticizing the region. It should be noted that the members 5, 6 are also close fitting to the joint in order that the faces and shoulder help prevent loss of material from the plasticized zone.

Figure 2A:
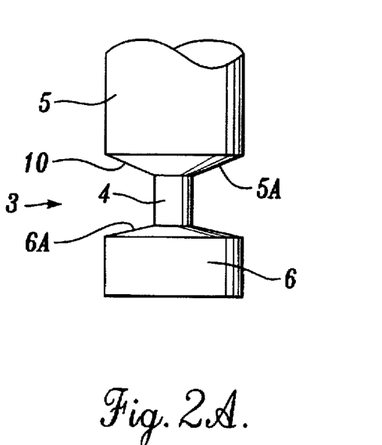
FIGS. 2A and 2B are side elevational views of two different rotating members.
Figure 2B:
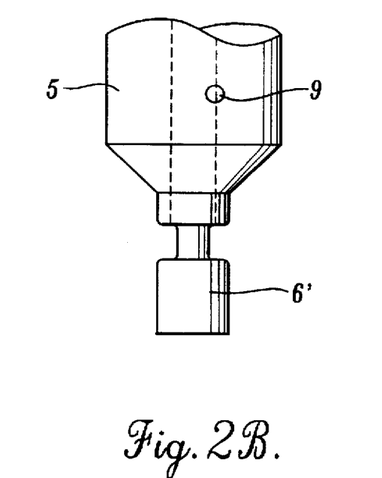

Alternatively, the upper and lower members 5, 6 and probe 3 may be manufactured as a single rotating member, or bobbin, as shown in FIG. 2A. A preferred preset gap of typically about 3.3 mm is provided between faces 5A and 6A. As shown in FIG. 2B, the bobbin may be demountable with two parts, 5 and 6' secured together, for example, by a cotter pin 9. For this arrangement, it is convenient to drill a hole corresponding to the interior part 6' diameter in the butting plates to be joined and the two parts 5, 6' of the bobbin brought together firmly onto the plates before rotation. Furthermore, the gap may be made adjustable over a short distance by a suitable cam lever or eccentric (not shown) to allow for variation in the thickness of the sheets to be joined from nominal values. Yet again, the component parts of the bobbin may be suitably spring-loaded so as to be biased towards each other so that a tight fit is maintained in spite of small variations in the sheet thickness.

Figure 3:
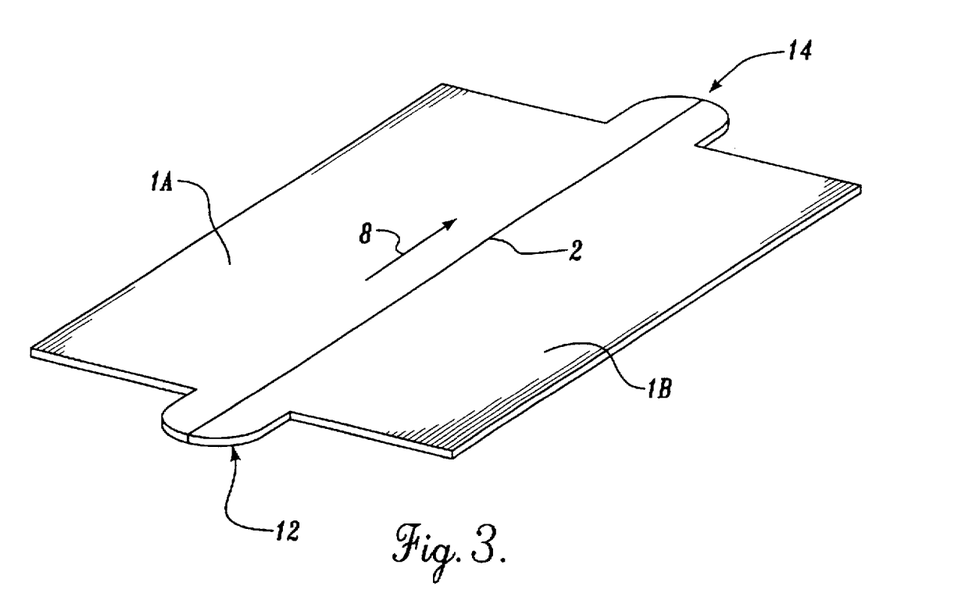
FIG. 3 is a perspective view illustrating run-on and run-off tabs.

For each method described herein, to avoid pre-drilling a hole in the butting sheets to be joined, suitable run-on 12 and run-off 14 extensions can be utilized. These extensions, or end-tabs, provide starting and stopping points along a weld seam that may be later trimmed away. Similarly, a piece of washer-shaped piece of a material similar in composition to those plates being joined, may be fastened around the pin of the rotating member and pressed against the starting edge of the sheets to be joined. As plasticized material is formed, there is minimum space for material to escape, and a uniform zone is formed throughout the length of the seam to be joined.

The shoulders of abutting faces 5A, 6A of the bobbin may be machined substantially square, but preferably are provided with a chamfer (see FIG. 2A). In use, it can be observed whether the top and bottom faces are in good contact with the materials to be joined by the visibly disturbed zone corresponding in width to the diameter of the faces. Alternatively, and particularly for the spring-loaded version, the faces can be slightly domed with a radius of the order of 0.1 m or greater, such that a contact zone corresponding to the applied spring load is developed of sufficient width. Preferably, the width of this contact zone should be at least 50% greater than the diameter of the pin generating plasticized material.

With suitable bobbins as described, the rotating member can be drawn along joint line 2 via a spline (not shown) such that the member floats according to the surface shape of the materials being joined. With a pre-machined workpiece held in a suitable jig, a floating member is not necessary and a preset bobbin can be used.

Using the above described two-part bobbin in one example, the friction stir welding technique has been used to successfully join an aluminum silicon magnesium alloy (BS6082), nominally 3.2 mm thick. The overall width of the heat-affected zone was approximately 9 mm wide, corresponding to the contact zone on the chamfered bobbin used. In this example, a 6 mm diameter pin was rotated at 1500 rpm (peripheral speed of approximately 0.47 m/sec) and traversed along the joint line at 370 mm per minute. It should be noted that the contact faces of the bobbin contributed to the heat input as well as the heating provided by the rotating pin and corresponding plasticized zone. For lower rotational rates, the travel rate is preferably also reduced, e.g., at 800 rpm a suitable travel speed is about 190 mm per minute. Excess travel speed leads to void formation or lack of consolidation of the plasticized material.

Figure 4:
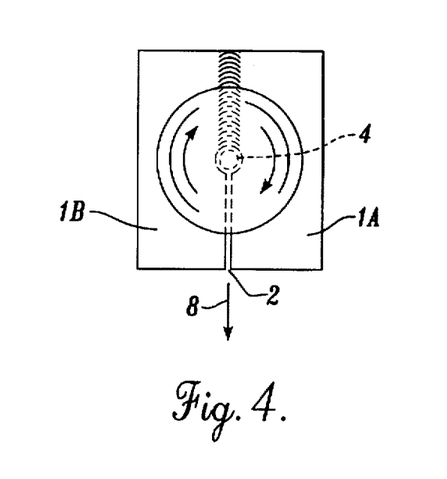
FIG. 4 is a plan view illustrating the flow of plasticized material and the resultant surface markings with respect to the joint line.

As illustrated in FIG. 4, the plasticized material is swept around the rotating probe 4 such that voids, if any, tend to form on the side where the rotating surface is moving in the same direction as the travel along the joint (advancing edge). It appears there is very little, if any, difficulty in obtaining complete consolidation with the plasticized material filling the joint zone in other regions, particularly on the side where the rotating surface is against the direction of travel of the bobbin through the material (retreating edge).

Figure 5A:
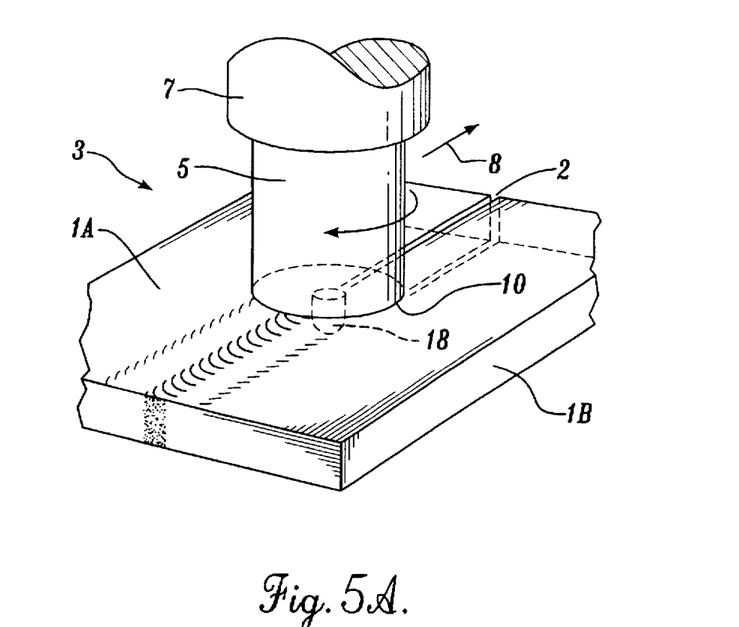
FIGS. 5A, 5B, and 5C are an isometric view, a side view, and a plan view, respectively, of a second example method of friction stir welding.
Figure 5B:
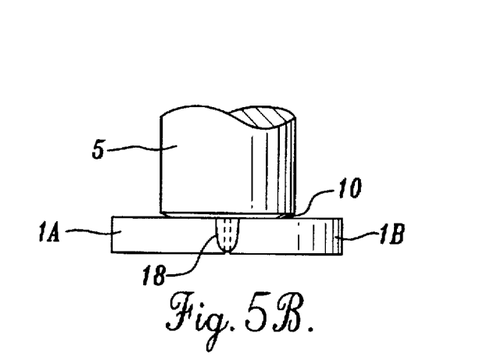

In a second method of friction stir welding illustrated in FIGS. 5A and 5B, the non-consumable member has a slightly tapered cylindrical probe 18 at its leading end, which is pressed against and becomes inserted between plates 1A, 1B, but does not extend completely through the thickness of the materials being joined. A lower member is not required since the probe does not actually extend through the entire thickness of the plates. It is preferable to tilt the rotating member with probe slightly aftward relative to the direction of linear probe travel. The appearance of the upper surfaces of the plates after the butt welding operation is shown in FIGS. 5A and 5C.

Figure 6A:
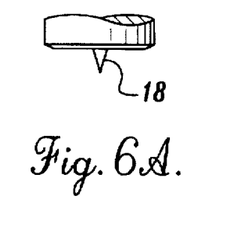
FIGS. 6A, 6B, and 6C show various types of probe shapes for use with the method of FIGS. 5A–5C.
Figure 6B:
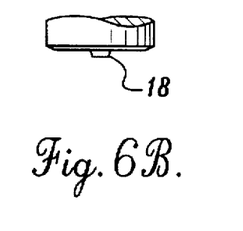
Figure 6C:
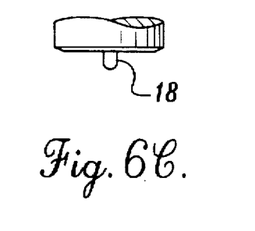

For all cases, the shape of the probe is important. A conically pointed probe (FIG. 6A) enables the probe to enter the plates relatively easily but results in a narrowing of the plasticized region near the apex of the probe. A frustoconically shaped cone, such as shown in FIG. 6B, works best when a pre-drilled depression is formed in the butting sheets to be joined. Preferably, the probe is of a slightly tapered cylindrical form with a blunt nose, as shown in FIG. 6C. This shape enables the probe to be pressed against the sheets so that it inserts itself into the plates and forms a plasticized zone around the probe which travels along the joint seam as previously described.

Figure 5C:
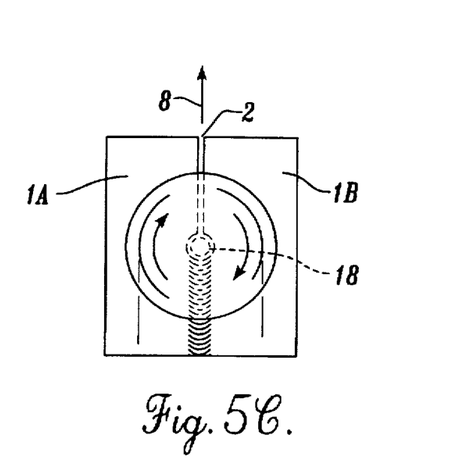

For a joint between aluminum alloy plates 6 mm thick made by the method illustrated in FIGS. 5A–5C, the probe may be rotated at 850 rpm and traversed along the joint line at 240 mm per minute. Higher rotational speeds, such as 1000 rpm, enable greater travel rates to be used, up to about 300 mm per second, but increasing the travel rate excessively leads to the formation of pores along one side, as was found with the parallel-sided arrangement of FIG. 1. Alternatively, the rotational speed can be reduced such as down to 300 rpm with a corresponding reduction in travel rate. For a given travel speed there is a reasonable tolerance in acceptable rotational rates, e.g., at 4 mm per second (240 mm per minute) for the aluminum silicon magnesium alloy (BS6082) satisfactory results are obtained for rotational speeds between 440 and 850 rpm.

Figure 7:
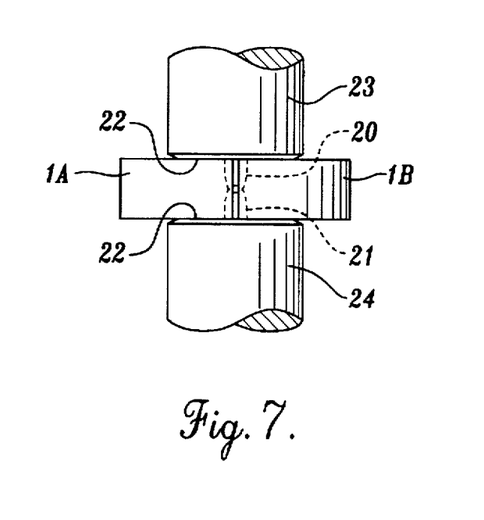
FIG. 7 is a schematic view of a further process whereby passes are made both above and below the plates being welded.

FIG. 7 illustrates a further exemplary method of friction stir welding in which a pair of non-consumable probes 20, 21 similar to the probe 18 are provided on opposite sides of the plates 1A, 1B. The probes 20, 21 are urged toward each other, but are displaced in the direction of travel such that the plates are clamped together in position, but not sufficiently to cause excessive heating at the interface between the outwardly facing surfaces of the plates and the non-consumable members. As with friction stir welding in general, it is desirable to push the member into the plate somewhat in order to produce the heat required to accomplish the weld. However, excessive pushing is undesirable. The plates should not be pushed so hard as to become mashed. Alternatively, the method of FIGS. 5A–5C can be carried out as separate operations on each side of the plates being joined. An example of a successful double-sided weld according to the above was conducted for an aluminum silicon magnesium alloy at operating conditions of 240 mm per minute travel at 850 rpm for each side.

The contact face 22 of each member 23, 24 can be substantially square or preferably slightly chamfered to relieve the outer edges thereof. The appropriate load or positioning of the rotating probe is then determined by viewing the wide by thin layer of disturbed plate surface material that forms as a result of the face being in contact with the plates. Alternatively, the face of the rotating member can be slightly domed similar to the face of the bobbin in FIGS. 2A and 2B, such that at a given load the surface contact area expands to at least 50% greater than the diameter of the probe itself. Contact zones up to three times probe diameter have been found satisfactory. For thinner materials it is preferable to scale the probe such that, for example, it is reduced to 4 or 3 mm. Unexpectedly, the preferred rotational speed is also reduced together with the travel rate for a smaller diameter probe. For example, with a 3.3 mm diameter probe a rotational speed of about 440 rpm and about 120 mm per minute travel is satisfactory. In all these cases, the slight taper of the probe face 22 amounts to around 2°.

The methods described with respect to FIGS. 1, 5A, and 7 can be applied to the joining together of the abutting faces of a crack existing in a given material or substrate thereby to repair the crack. The crack may extend through the full thickness, or only partially penetrate the thickness of the material, and may lie in parent material, or in a heat affected zone in the material, such as adjacent to a weld or in a weld itself. The method of FIG. 5A is generally suitable for a partially penetrating crack, although in principle, a fully penetrating method could also be utilized for partially penetrating cracks. The technique is essentially similar to that already described, where preferably the probe is inserted into the parent material (to the depth of the crack at least) before traveling along the crack interface, to generate plasticized material by frictional heating, which on cooling consolidates the material where the crack previously existed. The end of the crack in the direction of travel can be consolidated in various ways. For example, the probe can be left in situ or, alternatively, a pass made in the reverse direction and overlapped with the initial pass so that the termination of the reverse pass lies in a region away from the original crack site.

Present Invention Cutting Tool Improvement

When plates are welded according to the friction stir methods described above, there is a tendency for excess, roughened material to accumulate on the outer surfaces of the plates. Although the amount of excess material is typically slight, for those applications requiring a smooth outer surface, the excess material must be removed. As illustrated in FIGS. 8–16, the present invention includes a cutting tool 30 assembled by adding one or more cutting edges 32 to a conventional translating friction stir welding tool so that the modified tool will machine the weld as it is generated. The present invention cutting tool machining method includes applying water or water mist to the cutting tool and joint as the joint is being welded in order to quickly cool the cutting edges to prevent material from adhering to them. Adding a cutting edge to the FSW tool and applying cooling water to the FSW process results in a finished, machined weld surface created simultaneous with the creation of the weld. Thus, the present invention cutting tool and method reduces the number of steps required to produce a properly machined friction stir weld.

The cutting tool 30 basically includes the attachment of cutting edges 32 to a conventional rotating member 38. One or more support mechanisms are used to attach the cutting edges near the outer lower periphery of the rotating member. Each support mechanism includes a lower end that has a cutting edge either integrally formed, or attached, thereat. Cutting edges are preferably used on the rotating members of conventional friction stir welding tools that will cause a surface disturbance at the weld seam. For example, the bobbin arrangement of FIG. 2B would preferably include cutting tools located on both the rotating member 5 and the rotating member 6'. It is also preferable that each cutting edge be, in some manner, disengagable from its rotating member so that worn cutting edges may be easily replaced with new ones. The present invention cutting tool encompasses using cutting edges that are integral with the rotating member, though this arrangement is not preferred.

The support mechanisms are placed relative to the rotating member so that each cutting edge is positioned at a radial distance from the center of the rotating member equal to or greater than the maximum width of the anticipated surface disturbance that will be created when the weld is made. This generally means that the cutting edge should be placed just outside of the face 10 and/or shoulder 11 regions. The cutting edge is positioned at a height equal to the desired height of the finished seam surface. As the member 38 rotates, the cutting edge 32 also rotates, clearing away material disturbed by the rotating member probe 40. As the entire probe is translated along the joint 2, the circle defined by the cutting edge also translates, which causes the debris to be cleared from the entire weld area. The result is a smooth and polished machined weld.

The basic method of using the present invention includes mounting the cutting tool 30 on the rotating member 38 and applying a continuous water supply from a liquid source 82 to the weld joint 2 while rotating and translating the probe 40 along the joint. In the preferred embodiment, the water is in the form of a water and air mist mixture 84. The preferred water temperature is roughly room temperature, i.e., about 20° C., and the flow-through volume is about 0.01 to 0.10 gallons per minute. The water may be issued under pressure and applied directly to the area, or junction, where the cutting edge meets the material. The important aspect of using water is that it be sufficiently available to cool the outer surface of the cutting edges. It should be noted that water is preferred because of its lost-cost abundance. Other liquid coolants may be used provided they do not interfere with weld formation. The runoff water from this process may be recycled by removing the metal particulates accumulated from machining the weld.

As with the current FSW process, the preferred embodiment of the method of the probe with the present invention cutting tool includes tilting the rotating member with probe slightly aft relative to the direction of linear probe translation. When the cutting edges are added, they machine away surface material mainly from behind the dragging shoulder of the rotating member. This results in the removal of a minimum amount of material from the weld and leaves a smooth workpiece weld surface. Where practical, run-on 12 and run-off 14 extensions should preferably be used to provide a starting point and a stopping point for the joint. See FIG. 3. The extensions may be added to the joint as separate pieces, or they made be made integral with one or both of the plates to be joined. Once the weld is accomplished, the extensions are removed, leaving a properly machined continuous surface that runs the entire length of the weld.

Figure 8:
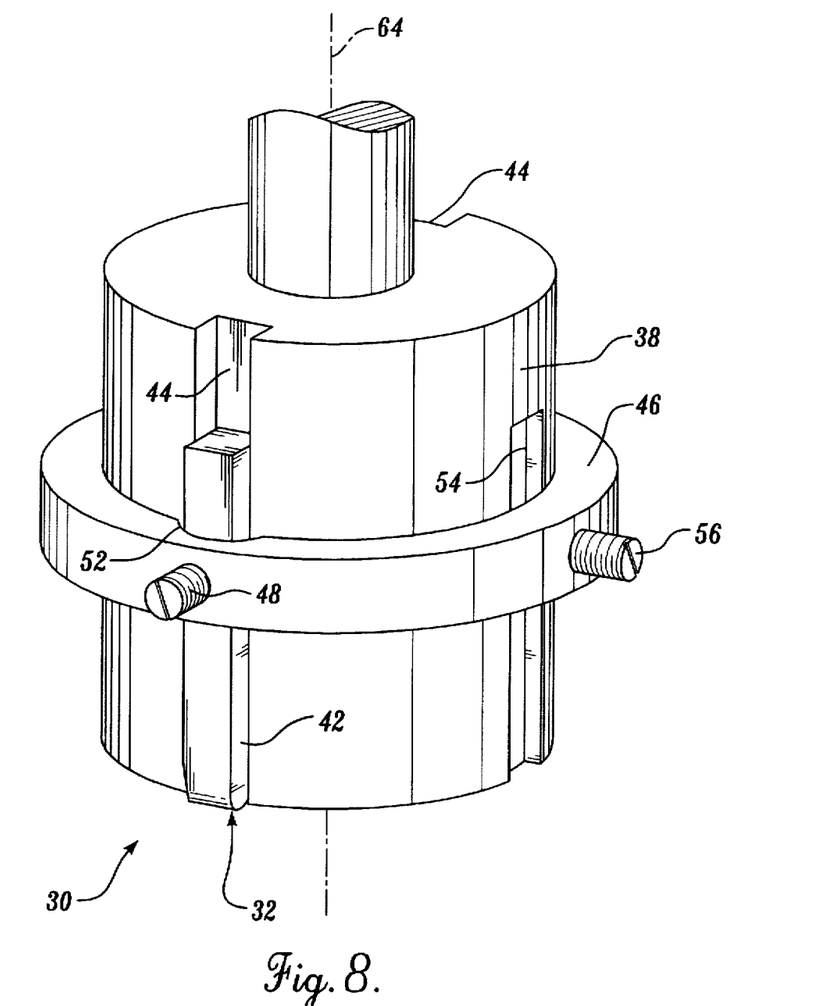
FIG. 8 is an isometric view of a first embodiment of a cutting tool formed in accordance with the present invention.
Figure 9:
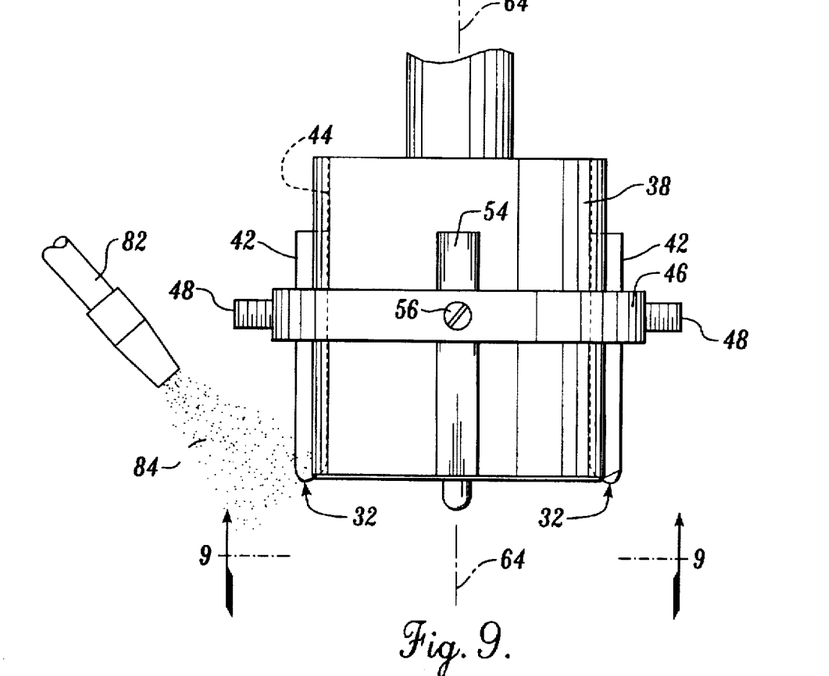
FIG. 9 is a side view of the cutting tool of FIG. 8.
Figure 10:
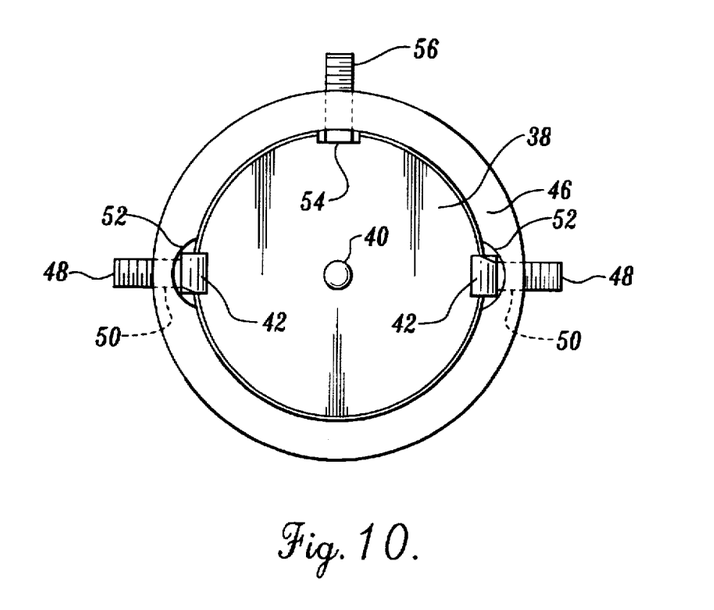
FIG. 10 is a bottom up view of the cutting tool of FIG. 8.
Figure 11:
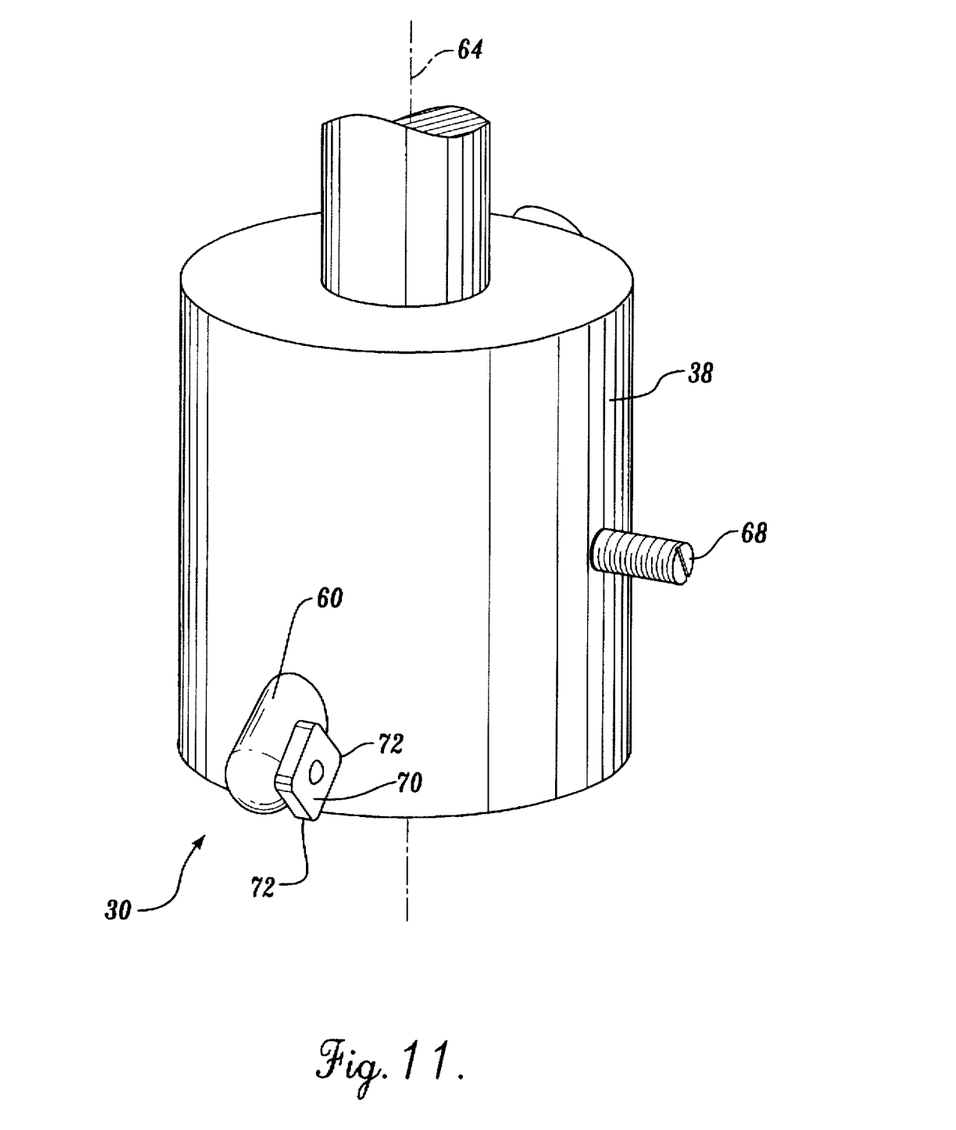
FIG. 11 is an isometric view of a second embodiment of a cutting tool formed in accordance with the present invention.
Figure 12:
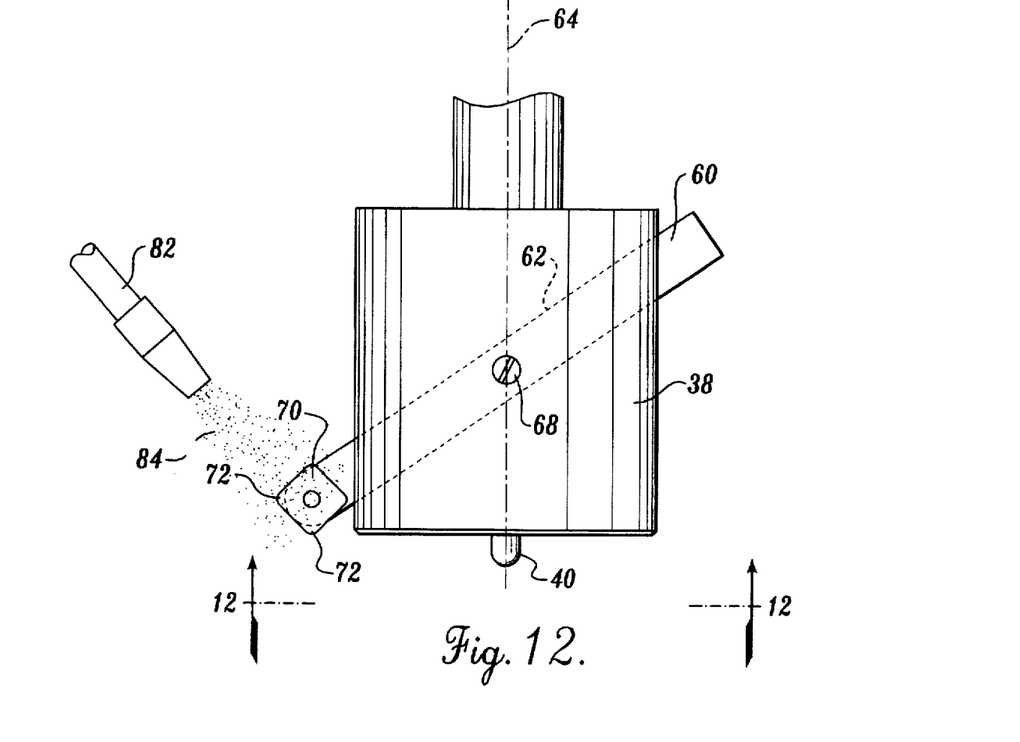
FIG. 12 is a side view of the cutting tool of FIG. 11.
Figure 13:
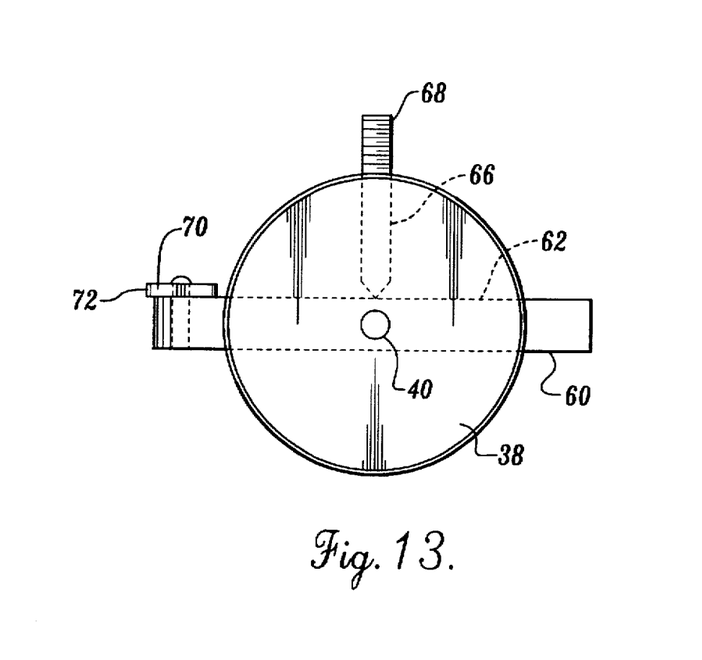
FIG. 13 is a bottom up view of the cutting tool of FIG. 11.

Three preferred cutting tool embodiments are described herein. FIGS. 8–10 are directed to the first embodiment; FIGS. 11–13 to the second; and FIGS. 14–16 to the third.

Referring initially to FIG. 8, there shown is a perspective view of a first embodiment of a cutting tool formed according to the present invention. The support mechanism includes one or more cutting inserts 42, each having a lower end cutting edge; a like number of vertically oriented, insert-engaging grooves or keyways 44 formed in the outer circumference of the rotating member 38; a collar 46 sized to closely surround the rotating member with engaged inserts; a collar attachment arrangement for securing the collar to the rotating member; and a number of set screws 48 for anchoring the inserts 42 to the rotating member 38.

The cutting inserts 42 are generally of rectangular cross-section with rounded, lower end cutting edges. The cutting edges may be formed in a different shape; however, it is best not to make the edges too narrow, as they tend to wear out faster. The cutting edges are preferably composed of high speed steel or cobalt-alloyed high speed steel. For each cutting insert there is a corresponding groove formed in the outer surface of the rotating member within which the support may be engaged. The grooves are oriented generally parallel to the axis of rotation of the member. The depth of each groove is preferably about half the insert cross-sectional thickness. This size allows the cutting edge to be located just outward of the rotating member shoulder, which typically defines the outermost region of plate surface disturbance. The grooves are not absolutely required for the present invention, but they are preferred because they also help restrain the cutting inserts and prevent them from twisting or otherwise shifting during rotation.

The collar 46 is in the form of a continuous ring having various threaded radial holes 50 therein placed in locations corresponding to the locations of the cutting inserts and grooves. The collar is preferably formed of steel. The cutting inserts are placed within their respective grooves and the collar is slipped around the member and inserts. The preferred collar 46 includes arcuate cutouts 52 located in the internal surface of the collar at each insert for allowing a portion of the insert to extend beyond the outer radius of the rotating member. This is advantageous because it positions the cutting edges just outward of the outer radius of the rotating member lower surface face. After the collar 46 is in position, set-screws 48, sized to fit the radial holes 50, are screwed through the radial holes toward their respective cutting insert. The cutting insert 42 is thereby confined to its groove 44 by the clamping force of the set screw 48. The collar attachment arrangement may include a separate groove 54 and set screw 56 for securing the collar 46 to the rotating member 38.

In preparation for operations when using the first embodiment of a cutting tool, the cutting inserts 42 are placed in the rotating member grooves 44, the collar 46 is slipped over the member 38 and cutting inserts 42, and the set screws 48 are engaged. During operations, the FSW tool with cutting edges is rotated while water is applied to the region of the cutting edges. The water prohibits the hot stirred metal from accumulating on the cutting edges by keeping the cutting edges 32 cool. Linear translation of the FSW tool 30 with cutting edges causes the cutting edges to machine the area defined by the cutting edge circumference.

Referring to FIGS. 11–13, there shown are views of a second embodiment of a cutting tool formed according to the present invention. The second embodiment cutting tool support mechanism includes a cutting insert holder 60 having a lower end cutting edge; an insert holder hole 62 extending transversely through the rotating member 38 and oriented angularly away from the axis of member rotation 64; a threaded radial hole 66 formed in the rotating member 38; and a screw 68 for engaging into the radial hole 66 to press against the cutting insert holder 60.

The cutting insert holder 60 has a rectangular cross-section and a lower end to which a cornered cutting insert 70 may be removably attached. The preferred cutting insert 70 includes a number of extending corners 72, as would be provided with a square or triangular shaped piece. The corners serve as cutting edges and are positioned near the shoulder 10 of the rotating member 38, at a depth of roughly 0.002 to 0.010 inches below the shoulder 10. The cornered cutting insert 70 should be attached to the leading edge side of the cutting insert holder, i.e., the forward-most side relative to the direction of probe rotation. The cornered cutting insert is preferably formed of high speed steel or cobalt-alloyed high speed steel. The attachment of the cornered cutting insert to the cutting insert holder may be accomplished using conventional means, e.g., by a screw through the cutting insert, by an insert retaining clip that bolts to the cutting insert holder, etc.

The insert holder hole 62 extends diagonally through the rotating member. The cutting insert holder 60 is inserted into the hole 62 and held in place by the screw 68 which is engaged with the rotating member radial hole 66. The cutting insert holder is thereby confined to the insert holder hole by the crosswise force of the screw. The cutting insert holder is located in the hole so that the cutting edge projects slightly from the outer circumference of the shoulder and at a depth near that of the shoulder. It is preferable that the cutting edge be located roughly 0.002 to 0.010 inches below the shoulder 10 and radially outward roughly 0.050 to 0.010 inches relative to the probe.

During operations when using a cutting tool formed according to the second embodiment, the FSW tool 30 with cutting edge is rotated and simultaneously advanced along the joint while water is applied to the region of the cutting edges at the material. The water prohibits the hot stirred metal from accumulating on the cutting edge surfaces by keeping the cutting edge cool. Linear translation of the FSW tool with cutting edge causes the cutting edge to machine the area defined by its circumference. Should the cutting edge become dulled, the cornered cutting insert may be reoriented so that its next corner will act as a fresh, new cutting edge.

Figure 14:
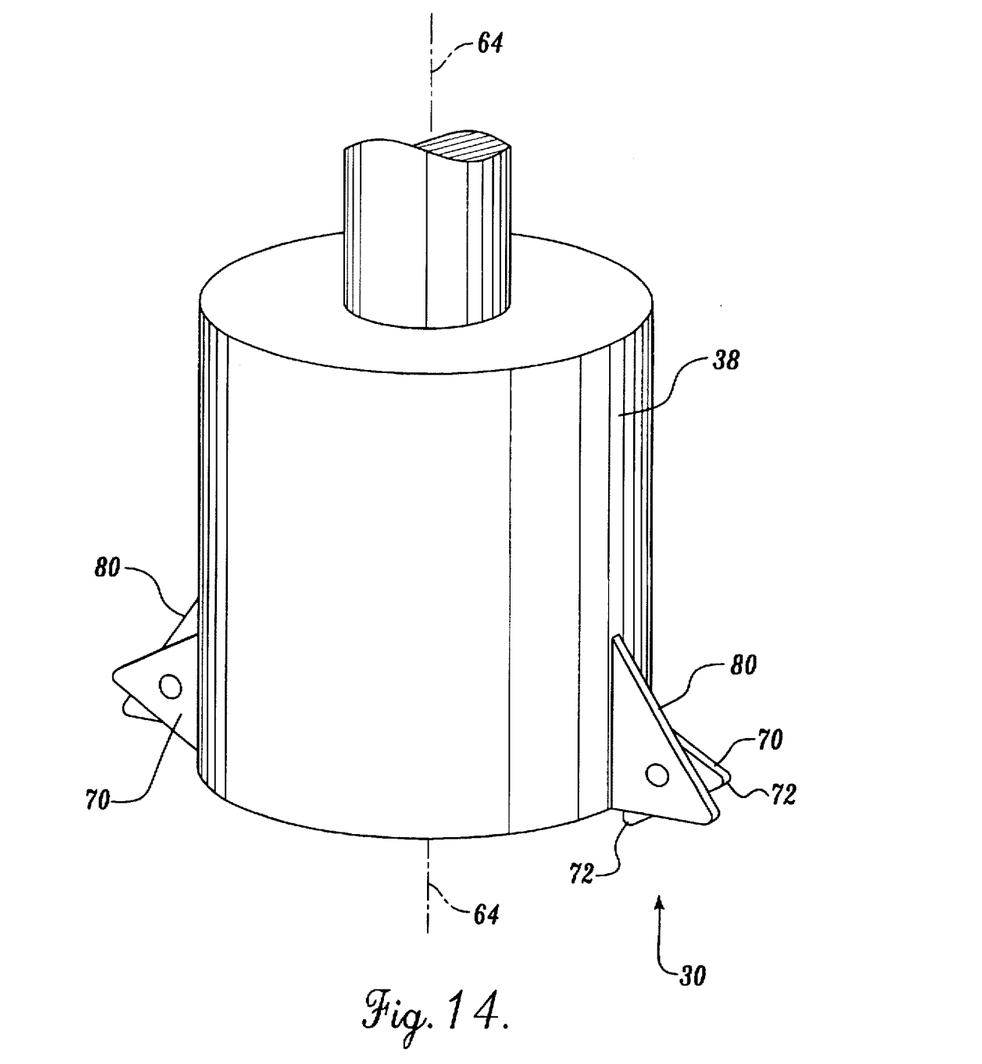
FIG. 14 is an isometric view of a third embodiment of a cutting tool formed in accordance with the present invention.
Figure 15:
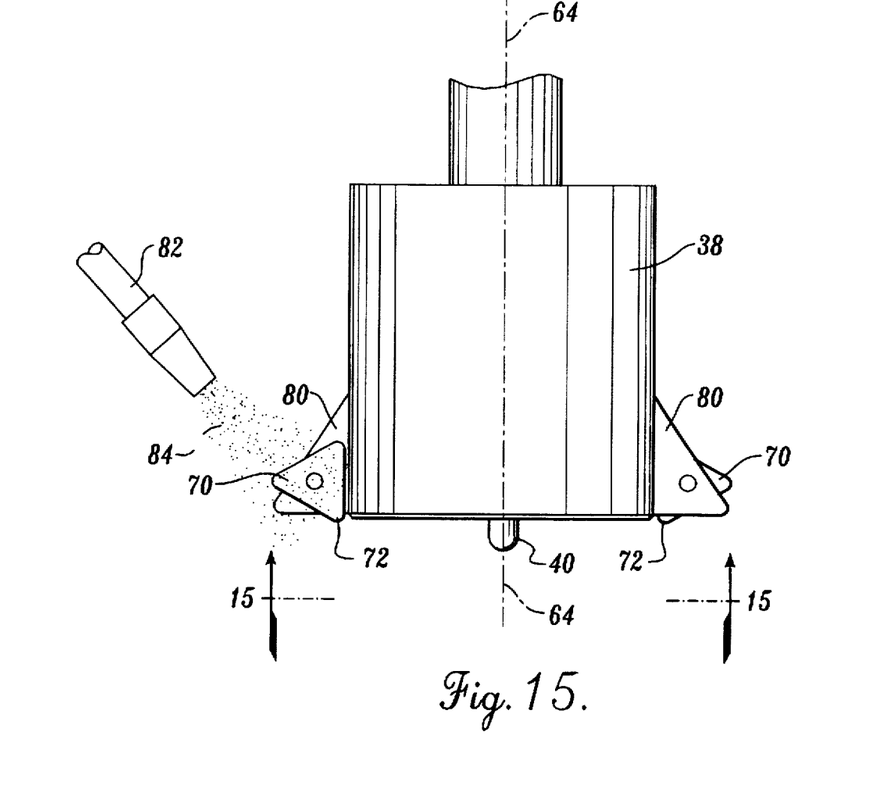
FIG. 15 is a side view of the cutting tool of FIG. 14.
Figure 16:
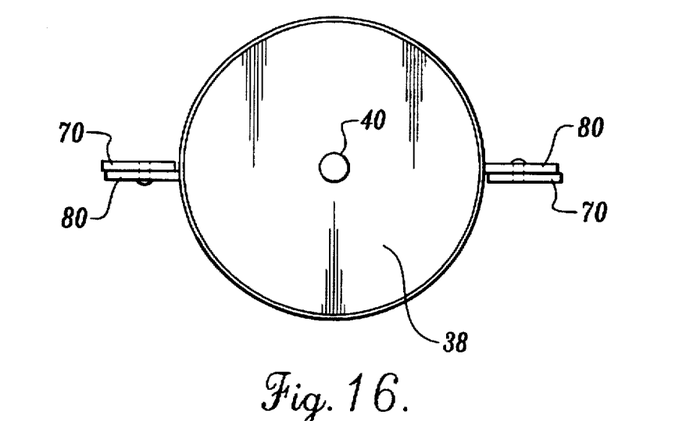
FIG. 16 is a bottom up view of the cutting tool of FIG. 14.

Referring to FIGS. 14–16, there shown are views of a third embodiment of a cutting tool formed according to the present invention. The third embodiment cutting tool is similar to the second tool embodiment, except instead of using a cutting insert holder, the third embodiment has one or more integral tabs 80 extending radially from the circumference of the rotating member near the shoulder. The tabs are oriented relative to the rotating member in such a manner as to resemble radial fins. There are two tabs shown in FIGS. 15 and 16. The tabs may be attached to the rotating member 38 using a conventional method, e.g., welded, molded, machined from the same piece as the rotating member, etc. Each tab has an associated cornered cutting insert 70 with one or more corners 72 to act as cutting edges. The operation of the cornered cutting insert 70 is essentially the same as that described above for the second embodiment tool, and thus will not be repeated here.

While the preferred embodiment of the invention has been illustrated and described, it will be appreciated that various changes can be made therein without departing from the spirit and scope of the invention. Example changes include using the cutting insert holder and small cornered cutting insert of the second and third preferred tool embodiments in lieu of the elongated cutting insert of the first preferred tool embodiment. Various notching schemes could be used to aid the user in locating any of the supports, the collar, or the cutting edges. Various methods of attaching the cutting edges to the rotating members could be used instead of the preferred three embodiments detailed here.

The embodiments of the invention in which an exclusive property or privilege is claimed are defined as follows:

1. In a friction stir welding tool having a non-consumable rotating probe attached to a rotating member, wherein the improvement comprises:
   (a) one or more cutting edges; and
   (b) one or more support mechanisms for mounting the cutting edges to the member;
   whereby rotation of the member and of the non-consumable probe causes like rotation of the one or more cutting edges which further causes the one or more cutting edges to machine the outer surface of the friction stir weld.

2. The improvement of claim 1, wherein the one or more support mechanisms for mounting the cutting edges position the cutting edges near the outer periphery of the rotating member at a depth of roughly 0.002 to 0.010 inches below the level of the rotating member.

3. The improvement of claim 1, wherein the one or more support mechanisms for mounting the cutting edges comprises:
   (a) one or more cutting inserts, each cutting insert having a cutting edge at a lower end thereof; and
   (b) means for detachably mounting the cutting inserts to the outer circumference of the rotating member.

4. The improvement of claim 3, wherein the means for detachably mounting the cutting inserts comprises:
   (a) one or more grooves formed in the rotating member, each cutting insert being engagable in a groove;
   (b) a collar attachable to the outer circumference of the rotating member, the collar for securing each cutting insert to the rotating member; and (c) means for securing the cutting inserts within the grooves at a desired location.

5. The improvement of claim 4, wherein the collar further includes interior cutouts at each cutting insert location to allow for the use of cutting inserts having differing dimensions.

6. The improvement of claim 4, wherein the means for securing the cutting inserts include set screws threaded through radial holes formed in the collar, the set screws for pressing the cutting inserts into the grooves.

7. The improvement of claim 3, wherein the cutting edge is located at a depth of roughly 0.002 to 0.010 inches relative to the level of the rotating member and an outward distance of about 0.050 to 0.100 inches relative to the side of the rotating member.

8. The improvement of claim 1, wherein the one or more support mechanisms for mounting the cutting edges comprises:

(a) one or more cornered cutting inserts, each cornered cutting insert having one or more cutting edges; and (b) means for mounting the one or more cornered cutting inserts near the outer circumference of the rotating member.

9. The improvement of claim 8, wherein the one or more cornered cutting inserts is one cornered cutting insert and the means for mounting the cornered cutting insert comprises:

(a) a cutting insert holder having a lower end;

(b) a insert holder hole formed in the rotating member, the cutting insert holder being engagable in the insert holder hole;

(c) means for securing the cutting insert holder within the insert holder hole at a desired location; and (d) means for attaching the cornered cutting insert to the cutting insert holder lower end.

10. The improvement of claim 9, wherein the cornered cutting insert has four corners capable of acting as the cutting edges.

11. The improvement of claim 9, wherein the cornered cutting insert is removably attached to the cutting insert holder by a screw arrangement.

12. The improvement of claim 9, wherein the attachment means includes a set screw threaded through a radial hole in the rotating member, the set screw for pressing against the cutting insert holder in order to secure the cutting insert holder at a particular location during use.

13. The improvement of claim 9, wherein the cutting edge is located at a depth of roughly 0.002 to 0.010 inches relative to the level of the rotating member and an outward distance of about 0.050 to 0.100 inches relative to the side of the rotating member.

14. The improvement of claim 8, wherein the means for mounting the one or more cornered cutting inserts comprises:

(a) one or more tabs extending radially from the lower end of the rotating member; and (b) means for securing each cornered cutting insert to a tab.

15. The improvement of claim 14, wherein the cornered cutting insert has one or more corners to act as the one or more cutting edges.

16. The improvement of claim 14, wherein the cornered cutting insert is removably attached to its respective tab by a central screw arrangement.

17. The improvement of claim 14, wherein the cutting edge is located at a depth of roughly 0.002 to 0.010 inches relative to the level of the rotating member and an outward distance of about 0.050 to 0.100 inches relative to the side of the rotating member.

18. The improvement of claim 14, wherein the one or more tabs are integrally formed with the rotating member.

19. The improvement of claim 14, wherein the cutting edge is attached to the leading edge surface of its respective tab.

* * * * *